United States Patent [19]

Kajiya et al.

[11] Patent Number: 5,708,103

[45] Date of Patent: Jan. 13, 1998

[54] PROCESS FOR PRODUCING A POLYMER OF VINYLIC COMPOUNDS

[75] Inventors: Satoshi Kajiya; Kenji Shachi; Kazushige Ishiura, all of Tsukuba, Japan

[73] Assignee: Kuraray Co., Ltd., Kurashiki, Japan

[21] Appl. No.: 592,628

[22] Filed: Jan. 26, 1996

[30] Foreign Application Priority Data

Feb. 1, 1995 [JP] Japan ................. 7-036138

[51] Int. Cl.$^6$ .................. C08F 4/00; C08F 14/00; C08F 10/00
[52] U.S. Cl. .................. 526/204; 526/291; 526/348
[58] Field of Search .................. 526/204, 291, 526/348

[56] References Cited

U.S. PATENT DOCUMENTS

| Re. 34,640 | 6/1994 | Kennedy et al. | 525/244 |
|---|---|---|---|
| 4,910,321 | 3/1990 | Kennedy et al. | |
| 4,929,683 | 5/1990 | Kennedy et al. | |
| 4,946,899 | 8/1990 | Kennedy et al. | 525/244 |
| 5,122,572 | 6/1992 | Kennedy et al. | |
| 5,219,948 | 6/1993 | Storey et al. | |
| 5,451,647 | 9/1995 | Faust et al. | 526/147 |

FOREIGN PATENT DOCUMENTS

| 3-174403 | 7/1991 | Japan . |
|---|---|---|
| WO 93/02110 | 2/1993 | WIPO . |
| WO 93/04100 | 3/1993 | WIPO . |

OTHER PUBLICATIONS

Robson F. Storey and Kim R. Choate, Jr., ACS Division of Polymer Chemistry, Polymer Preprints 35(2), 506, 1994.
Macromolecular Symposia, vol. 95, pp.71–78, Jun. 1995, Robson F. Storey, et al., "Kinetic Study of the Living Cationic Polymerization of Isobutylene Using t–Bu–m–-DCC/TICL$_4$/2,4–Dimethylpyridine Initiating System".

Journal of Polymer Science: Part A: Polymer Chemistry, vol. 29, pp. 427–435, 1991, G. Kaszas, et al., "Polyisobutylene–Containing Block Polymers by Sequential Monomer Addition. II. Polystyrene–Polyisobutylene–Polystyrene Triblock Polymers: Synthesis, Characterization, and Physical Properties".

*Primary Examiner*—Joseph L. Schofer
*Assistant Examiner*—Wu C. Cheng
*Attorney, Agent, or Firm*—Oblon, Spivak, McClelland, Maier & Neustadt, P.C.

[57] ABSTRACT

A process for producing a polymer of vinylic compounds comprising polymerizing at least one vinylic compound by using an initiator system comprising a compound containing, in the molecule, at least one group represented by the general formula:

$$-C(-R^1)(R^2)-X \qquad (I)$$

where each of $R^1$ and $R^2$ represents an alkyl, aryl or aralkyl group, and X represents an acyloxyl, alkoxyl or hydroxyl group or a halogen atom, and a Lewis acid, wherein (1) at least one of pyridine derivative (A) selected from the group consisting of a pyridine derivative (A-1) substituted at 2-position and 6-position with methyl group respectively and a pyridine derivative (A-2) substituted at 2-position with an alkyl group of 2 to 6 carbon atoms and not substituted at 6-position, and (2) an organic Lewis base (B) other than said pyridine derivative (A)

are present together in the polymerizing reaction system.

11 Claims, No Drawings

PROCESS FOR PRODUCING A POLYMER OF VINYLIC COMPOUNDS

BACKGROUND OF THE INVENTION

1. Field of the Invention

The present invention relates to a process for producing a polymer of vinylic compounds and more particularly to a process for producing a polymer of vinylic compounds by a living cationic polymerization method.

2. Related Art of the Invention

When vinylic compounds are polymerized by a cationic polymerization method, since carbon cations under growing are instable and the rate of polymerization is fast, it is generally difficult to produce a desired polymer with controlled average molecular weight and a narrow molecular weight distribution. Further, production of a block copolymer is also difficult. However, it has been recently developed a so-called living cationic polymerization method of preventing side reactions such as chain transfer reaction or termination reaction by stabilizing the growing carbon cations in cationic polymerization.

For instance, it is disclosed in U.S. Pat. Nos. 4,910,321, 4,929,683 and 5,122,572 that it is possible to perform living cationic polymerization of vinylic compounds such as isobutylene by using a polymerization initiator system comprising a carboxylic acid ester or ether and a Lewis acid and also possible to produce a block copolymer having polyisobutylene as one of polymer blocks by successively using isobutylene and other compounds as the vinylic compounds.

U.S. Pat. No. 4,946,899, U.S. Reissued Pat. No. 34,640, and Journal of Polymer Science: Part A: Polymer Chemistry, Vol. 29, pp. 427–435 (1991), disclose production of a block copolymer having polymer blocks of isobutylene and polymer blocks of other compounds by a living cationic polymerization method of vinylic compounds using an initiator system comprising a compound having, in the molecule, at least one group represented by the general formula:

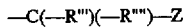

where each of R' and R" represents an alkyl, aryl or aralkyl group, and Y represents a carboxyl, alkoxyl or hydroxyl group or a halogen atom, and a metal halide as a Lewis acid in which an electron pair donor such as dimethyl sulfoxide, N, N-dimethylacetamide or pyridine is added to a reaction system and a proton scavenger such as 2,6-di-t-butylpyridine or 4-methyl-2,6-di-t-butylpyridine is added to the reaction system after polymerization of isobutylene at the first stage and before polymerization of other vinylic compounds at the second stage. The literatures cited above, describe that the electron pair donor has a function of controlling the rate of polymerization and suppressing side reactions such as chain transfer, as well as that the proton scavenger is effective for suppressing side reactions attributable to protonic impurities such as a water content.

Regarding the process for producing the polymer of vinylic compounds such as isobutylene according to the living cationic polymerization method as in the specification of U.S. Pat. No. 4,946,899, U.S. Pat. No. 5,219,948 discloses that titanium tetrachloride is present as a Lewis acid in the reaction system, and one of pyridines having no substituent at either 2-position or 6-position (unsubstituted pyridine or pyridine derivative having substituent such as an alkyl group only at 3- and/or 4-positions) is present in the reaction system as the electron pair donor (Lewis base) and hindered pyridine (only 2,6-di-t-butylpyridine is given as a specific example) is present as the proton scavenger. U.S. Pat. No. 5,219,948 describes that the electron pair donor is effective for making the molecular weight distribution narrow.

Further, Japanese Patent Laid-Open Hei 3-174403 describes that when at least one vinylic compound is polymerized by a living cationic polymerization method by using an initiator system comprising a compound having, in the molecule, at least one group represented by the general formula:

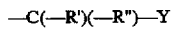

where R'" represents a hydrogen atom, or an alkyl or aryl group, R"" represents an alkyl or aryl group and Z represents an acyloxyl group, an alkoxyl group or a halogen atom, and a Lewis acid, the rate of polymerization can be controlled easily and a polymer with a narrow molecular weight distribution and a controlled molecular weight can be obtained by causing amines such as diethylamine, triethylamine or aniline; or pyridines such as pyridine, methylpyridine, ethylpyridine, t-butylpyridine, dimethylpyridine or di-t-butylpyridine to be present in the polymerizing reaction system. However, this patent literature does not mention about the use of the pyridines in combination with the amines or with other pyridines. In addition, for the alkyl-substituted pyridines such as monoalkyl substituted or dialkyl substituted pyridines, no position of the alkyl-substituent is shown except for 2,6-di-t-butylpyridine.

The present inventors have experimentally studied a process for producing a polymer of vinylic compounds by various types of known living cationic polymerization methods described above. As a result, it has been found that a water content, if incorporated in vinylic compounds or polymerization solvents used, reacts with a Lewis acid in the reaction system to form protons, which function as a polymerization initiator, and that results in a disadvantage of making it difficult to control the average molecular weight of the resultant polymer to a predetermined value or broaden the molecular weight distribution of the resultant polymer. Then, it has been found that it is important to prevent intrusion of the water content caused by the vinylic compounds and the polymerization solvents into the reaction system for the control of the rate of polymerization and the production of a polymer with a desired average molecular weight and a desired narrow molecular weight distribution at a high reproducibility. Strict dehydration of the vinylic compounds and the polymerization solvents used is not suitable to industrial application since this requires use of a highly reactive dehydrating agent such as calcium hydride or conducting distillation under the condition of low efficiency. Accordingly, for making it industrially possible to adopt a process for producing a polymer of vinylic compounds by the living cationic polymerization method, it is necessary that the polymerization rate can be controlled and the polymer can be produced at a desired average molecular weight and at a desired narrow molecular weight distribution, even if a slight amount of water is incorporated in the vinylic compounds and/or polymerization solvents, by a simple and convenient dehydrating treatment such as by using physical adsorption type dehydrating agent, for example, as a molecular sieve or aluminum oxide.

The present inventors have made a study on a case in which a slight amount of water remains in the vinylic compounds and/or the polymerization solvents used. As a result, it has been found that among the known production processes described above, the method as disclosed in Japanese Patent Laid-Open Hei 3-174403 of causing one kind of a compound selected from amines and pyridines to be present in the reaction system can control the average molecular weight and make the molecular weight distribution narrow effectively to some extent depending on the case in the resultant polymer as compared with a case in which amines or pyridines are not present at all, but that the effect is not yet sufficient. Further, the method as described in U.S. Pat. No. 4,946,899, U.S. Reissued Pat. No. 34,640, Journal of Polymer Science: Part A: Polymer Chemistry, Vol.29, pp. 427–435 (1991) and U.S. Pat. No. 5,219,948 in which a hindered pyridine such as 2,6-di-t-butylpyridine, and an electron pair donor such as pyridines having no substituent at either 2-position or 6-position, dimethyl sulfoxide or N,N-dimethylacetamide are caused to be present in the reaction system can provide a satisfactory result for controlling the average molecular weight and making the molecular weight distribution narrow.

However, the water solubility of 2,6-di-t-butylpyridine is extremely low (for example, $9.4 \times 10^{-3}$M according to the Journal of the American Chemical Society, Vol. 101, p. 7141 (1979)) and the water solubility is low also in other hindered pyridines such as 4-methyl-2,6-di-t-butylpyridine. Accordingly, when the resultant polymer is purified by a washing treatment using an aqueous liquid which is an industrially advantageous purifying method, efficiency for removing the hindered pyridine is extremely poor and, in this regard, the method wherein the hindered pyridine described above is used is not industrially suitable. If a compound having a good water solubility can be used instead of the hindered pyridine, it will be extremely desirable since an industrially advantageous method is applicable not only to the dehydration treatment of the vinylic compounds and/or polymerization solvents used but also to the purification of the resultant polymer.

SUMMARY OF THE INVENTION

An object of the present invention is to provide a process for producing a polymer of vinylic compounds, with industrial advantages, which can produce a polymer with a desired average molecular weight and a narrow molecular weight distribution upon living cationic polymerization of vinylic compounds even if a slight amount of water is contained in the vinylic compounds and/or the polymerization solvents used, and which can purify the resultant polymer by a simple and convenient method.

As a result of earnest studies for attaining the foregoing object, the present inventors have found that when a specified pyridine derivative having a chemical structure with less steric hindrance is used instead of the hindered pyridine upon known living cationic polymerization of vinylic compounds, the average molecular weight and the narrow molecular weight distribution can be controlled in the same manner as in the case of using the hindered pyridine although it is quite different in view of the chemical structure from the hindered pyridine with regard to the degree of steric hindrance, and the pyridine derivative can be removed much more easily as compared with the hindered pyridine, when the resultant polymer is washed by using an aqueous liquid after the polymerization, and have accomplished the present invention.

In accordance with the present invention, the foregoing object can be attained by the provision of a process for producing a polymer of vinylic compounds in which at least one vinylic compound is polymerized by using an initiator system comprising a compound containing, in the molecule, at least one group represented by the general formula:

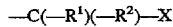

$$—C(—R^1)(—R^2)—X \qquad (I)$$

where each of $R^1$ and $R^2$ represents an alkyl, aryl, or aralkyl group, and X represents an acyloxyl, alkoxyl, or hydroxyl group or a halogen atom, and a Lewis acid, wherein (1) at least one pyridine derivative (A) selected from the group consisting of a pyridine derivative (A-1) substituted at 2-position and 6-position with methyl group respectively and a pyridine derivative (A-2) substituted at 2-position with an alkyl group of 2 to 6 carbon atoms and not substituted at 6-position, and (2) an organic Lewis base (B) other than said pyridine derivative (A), are present together in the polymerizing reaction system.

DETAILED DESCRIPTION OF THE INVENTION

The present invention is to be described more in details.

The compound represented by the general formula (I) used in the present invention is a compound having, in the molecule, at least one tertiary carbon atom to which an acyloxyl, alkoxyl, or hydroxyl group or a halogen atom is bonded. In the general formula (I), each of $R^1$ and $R^2$ represents an alkyl group, for example, methyl group and ethyl group; an aryl group, for example, phenyl group and methylphenyl group; or an aralkyl group, for example, benzyl group. In the general formula (I), X represents an acyloxyl group, for example, acetoxyl group and propionyloxyl group; an alkoxyl group, for example, methoxyl group and ethoxyl group; or a halogen atom, for example, chlorine atom and bromine atom. As typical examples of the compound containing, in the molecule, at least one group represented by the general formula (I), there can be mentioned, for example, an ester of a tertiary alcohol and a carboxylic acid such as (1-methyl-1-phenylethyl) acetate or (1-methyl-1-phenylethyl) propionate; an ether compound containing a tertiary carbon atom to which an alkoxyl group is bonded such as 1,4-bis(1-methoxy-1-methylethyl) benzene; a halogenated hydrocarbon compound containing a tertiary carbon atom to which a chlorine atom is bonded such as 2-chloro-2-phenylpropane, 1,4-bis(1-chloro-1-methylethyl)benzene, 1,3,5-tris(1-chloro-1-methylethyl) benzene, 2-chloro-2,4,4-trimethylpentane or 2,6-dichloro-2,4,4,6-tetramethylheptane; and a tertiary alcohol such as 1,4-bis(1-hydroxy-1-methylethyl)benzene or 2,4,4,6-tetramethyl-2,6-heptanediol.

As the Lewis acid used in the present invention, a metal halide is preferred for example. As a specific example of the metal halide, there can be mentioned, for example, boron halide compounds such as boron trichloride, boron trifluoride and boron trifluoride diethyl etherate; titanium halide compounds such as titanium tetrachloride, titanium tetrabromide and titanium tetraiodide; tin halide compounds such as tin tetrachloride, tin tetrabromide and tin tetraiodide; aluminum halide compounds such as aluminum trichloride, an alkylaluminum dichloride and a dialkylaluminum chloride; antimony halide compounds such as antimony pentachloride and antimony pentafluoride; tungsten halide compounds such as tungsten pentachloride, molybdenum halide compounds such as molybdenum pentachloride; and tantalum halide compounds such as tantalum pentachloride. Further, as the Lewis acid, a metal alkoxide such as a tetraalkoxy titanium can also be used.

As the vinylic compound used in the present invention, there can be mentioned, for example, cationically polymerizable vinylic compounds including olefins such as isobutylene, propylene and isoprene; and vinylic aromatic compounds such as styrene, methylstyrene, t-butylstyrene, chlorostyrene, bromostyrene and indene.

As the pyridine derivative (A) in the present invention, at least one compound selected from the group consisting of a pyridine derivative (A-1) substituted at both 2-position and 6-position with a methyl group respectively and a pyridine derivative (A-2) substituted at 2-position with an alkyl group of 2 to 6 carbon atoms and not substituted at 6-position is used.

As the pyridine derivative (A-1), in view of easy removal from a reaction mixture after the polymerizing reaction by washing with an aqueous liquid, there are preferred compounds represented by the following formula:

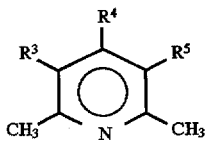

in which each of $R^3$, $R^4$ and $R^5$ represents a hydrogen atom or an alkyl group, providing that the sum of the number of carbon atoms contained in $R^3$, $R^4$ and $R^5$ is an integer within a range from 0 to 3, for example, 2,6-dimethylpyridine, 2,4,6-trimethylpyridine, 2,3,6-trimethylpyridine, 2,3,4,6-tetramethylpyridine, 2,3,5,6-tetramethylpyridine, 2,3,4,5,6-pentamethylpyridine, 2,6-dimethyl-3-ethylpyridine and 2,6-dimethyl-4-ethylpyridine. Among them, 2,6-dimethylpyridine is particularly preferred.

As the pyridine derivative (A-2), in view of easy removal from a reaction mixture by the wash with an aqueous liquid after the polymerizing reaction, there are preferred compounds represented by the following formula:

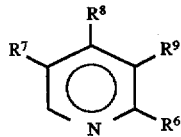

where $R^6$ represents an alkyl group of 2 to 6 carbon atoms and each of $R^7$, $R^8$ and $R^9$ represents a hydrogen atom or an alkyl group, providing that the sum of the number of carbon atoms contained in $R^6$, $R^7$, $R^8$ and $R^9$ is an integer within a range from 2 to 6, for example, 2-ethylpyridines such as 2-ethylpyridine, 2,3-diethylpyridine, 2,4-diethylpyridine, 2,5-diethylpyridine, 2,3,4-triethylpyridine, 2,3,5-triethylpyridine, 2,4,5-triethylpyridine, 2-ethyl-3-methylpyridine, 2-ethyl-4-methylpyridine and 2-ethyl-5-methylpyridine; 2-propylpyridine; 2-isopropylpyridine; 2-butylpyridine; 2-s-butylpyridine; 2-isobutylpyridine; 2-t-butylpyridine; 2-pentylpyridine; 2-isopentylpyridine; 2-(1-methylbutyl)pyridine; 2-(2-methylbutyl)pyridine; 2-(1-ethylpropyl)pyridine; 2-(1,1-dimethylpropyl)pyridine; 2-(1,2-dimethylpropyl)pyridine; 2-neopentylpyridine; and 2-hexylpyridine.

As the pyridine derivative (A) in the present invention, either a compound may be used alone or plural kinds of compounds may be used together. However, it is particularly desirable to use the pyridine derivative (A-1) as the pyridine derivative (A) in view of its particularly remarkable effect of forming a desired polymer with an average molecular weight approximate to a theoretical value and with a narrow molecular weight distribution even in a case of using vinylic compounds and polymerization solvents not subjected to strict dehydration.

In the present invention, other organic Lewis base (B) is used together with the pyridine derivative (A). The organic Lewis base (B) has no particular restriction and it is preferred to use pyridines having no substituent at either 2-position or 6-position, amines, carboxylic acid esters, ethers, carboxylic acid amides, ketones, sulfinyl compounds or phosphoric acid amides, alone or in combination of two or more of them, in view of their particularly significant effect of forming a desired polymer with an average molecular weight approximate to a theoretical value and with a narrow molecular weight distribution. As specific examples of pyridines having no substituent at either 2-position or 6-position, there can be mentioned, for example, pyridine; and pyridine derivatives having substituent only on one or both of 3- and 4-positions such as 3-methylpyridine, 4-methylpyridine, 3-ethylpyridine, 4-ethylpyridine, 3,4-dimethylpyridine, 3-ethyl-4-methylpyridine, 4-ethyl-3-methylpyridine and 3,4-diethylpyridine. As specific examples of the amines, there can be mentioned, for example, aliphatic amines such as trialkyl amines, for example, trimethylamine, triethylamine, tripropylamine and tributylamine and aromatic amines such as aniline. As specific examples of the carboxylic acid esters, there can be mentioned, for example, ethyl acetate and ethyl benzoate. As specific examples of the ethers, there can be mentioned, for example, diethyl ether, 1,4-dioxane and tetrahydrofuran. As specific examples of the carboxylic acid amides, there can be mentioned, for example, N,N-dimethylacetamide, N,N-dimethylformamide and N-methyl-2-pyrrolidone. As specific examples of the ketones, there can be mentioned, for example, acetone and methyl ethyl ketone. As specific examples of the sulfinyl compounds, there can be mentioned, for example, dimethyl sulfoxide. Further, as specific examples of the phosphoric acid amides, there can be mentioned, for example, hexamethylphosphorotriamide (HMPA).

As the organic Lewis base (B), those having not more than 10 carbon atoms in the molecule are preferred in view of easy removal from a reaction mixture after polymerizing reaction by washing with an aqueous liquid.

The number of groups contained in the compound containing the group shown in the general formula (I) above which is used in the present invention may be selected properly in accordance with the skeleton of the aimed polymer. For example, if the number of groups contained in the compound containing the group shown in the general formula (I) is 1 or 2, a polymer having a linear skeleton can be obtained. Further, if the number of groups in the compound containing the group shown in the general formula (I) is 3 or more, a polymer having a branched or star-like skeleton can be obtained.

The amount of the compound containing the group shown in the general formula (I) used can be determined properly while considering the mol numbers of the vinylic compound used, the average molecular weight of the aimed polymer or the like.

In the present invention, the addition amount of the Lewis acid to the reaction system is not always restricted. It is preferred that the mole number of the addition amount is equal with or more than the sum of the mol number of the group shown by the general formula (I), the mol number of the pyridine derivative (A) and the mol number of the organic Lewis base (B) and it is more preferred to further satisfy the condition that the mol number of the addition amount is within a range from 1 to 100 times the mol number of the group shown by the general formula (I). Further, the mol number of the pyridine derivative (A) is not always restricted but is preferably within a range from 0.1 to 100 times the mol number of the group shown by the general formula (I). Further, the mol number of the organic Lewis base (B) is not always restricted but it is within a range, preferably, from 0.1 to 100 times, more preferably, from 0.5 to 2 times the mol number of the group shown by the general formula (I).

In the present invention, there is no particular restriction on the order of adding the vinylic compound, the compound containing the group shown by the general formula (I), the Lewis acid, the pyridine derivative (A) and the organic Lewis base (B) to the polymerizing reaction system, and it is preferred to add them in such an order that the vinylic compound and the Lewis acid are brought into contact finally. In a case of using plural kinds of the vinylic compounds, a block copolymer can also be produced by adopting a sequential addition method of substantially completing the polymerization for a kind of the vinylic compound and then successively adding to polymerize another kind of the vinylic monomer to the polymerizing reaction system.

In the polymerization according to the present invention, organic solvents as used in usual cationic polymerization can be used. Specifically, aliphatic hydrocarbons such as hexane, heptane, cyclohexane and methylcyclohexane; aromatic hydrocarbons such as benzene, toluene and xylene; and halogenated hydrocarbons such as methyl chloride, ethyl chloride, methylene chloride, ethylene dichloride, chloroform and chlorobenzene can be used alone or in admixture.

As the polymerization temperature, the same conditions as those in usual living cationic polymerization of vinylic compounds can be adopted and, it can generally be selected properly within a range from $-150°$ C. to $50°$ C. although not always restricted. There is no particular restriction for the polymerizing reaction time and the reaction may be continued for an appropriate period of time, for example, while quantitatively determining the polymerization degree (conversion) of the vinyl compound in the polymerizing reaction system with lapse of time and generally it is within a range from 0.5 to 12 hours.

The polymerizing reaction in accordance with the present invention is preferably conducted under such a condition that less water intrudes in view of preventing side reactions. Accordingly, for chemical materials to be charged in a great amount to the polymerization reaction system such as vinylic compounds and organic solvents, it is preferred to previously subjecting them to dehydration as necessary. However, no strict dehydration is required in the present invention and usually it may suffice to use a simple and convenient dehydrating method with a physical adsorption type dehydrating agent such as a molecular sieve or aluminum oxide.

The polymerizing reaction according to the present invention can be terminated in accordance with the method adopted in usual living cationic polymerization of vinylic compounds, for example, a method comprising adding a protic compound such as methanol, ethanol or water to the polymerizing reaction system or a method comprising elevating the temperature of the polymerizing reaction system.

After the polymerizing reaction, the aimed polymer can be separated from the resultant reaction mixture and purified according to a method adopted in usual living cationic polymerization for vinylic compounds. For example, additives used for polymerization such as the Lewis acid and the pyridine derivative (A) can be removed by washing using an aqueous liquid such as water or an aqueous solution of alkali. A polymer of vinylic compounds can be separated and recovered by reprecipitating the reaction mixture after the removal of the polymerization additives into a poor solvent to the aimed polymer of the vinylic compound (for example, methanol).

As typical examples of the polymer of the vinylic compounds produced according to the process of the present invention, there can be mentioned polyisobutylene, polystyrene-polyisobutylene-polystyrene type triblock copolymer and the like, which are useful for example as the elastomer.

According to the present invention, a polymer of vinylic compounds can be formed with an average molecular weight approximate to the theoretical value and with a narrow molecular weight distribution even in a case of using vinylic compounds and/or polymerization solvents not subjected to strict dehydration and containing a slight amount of water. In addition, according to the present invention, the polymerization additives can be removed efficiently from the polymer by a simple and convenient method such as washing using an aqueous liquid. Accordingly, the present invention provides a process for producing a polymer of vinylic compounds with an industrial advantage.

The present invention will be explained more specifically referring to examples but the invention is not restricted only to the examples. In the examples, guaranteed reagent grade products were used as they were as commercially available chemical materials unless otherwise specified.

In the examples, the number average molecular weight (Mn) and the molecular weight distribution (Mw/Mn (in which Mw is a weight average molecular weight)) of the resultant polymer were determined by using GPC (manufactured by Shimadzu Corporation). The calculated value for the number average molecular weight (Mn(Calcd)), was determined by the following equation assuming the initiator efficiency as 100%:

$$Mn(\text{Calcd}) = \frac{\text{Amount of vinylic compound (mol)}}{\text{Amount of compound containing the group shown by the general formula (I) (mol)}} \times$$

$$\frac{\text{Polymerization degree (\%)}}{100} \times (\text{molecular weight of vinylic compound}) +$$

(molecular weight of the compound containing the group shown by the general formula (I))

The nitrogen atom content in the resultant polymer was measured by a microchemical analyzer.

EXAMPLE 1

In a dried reactor equipped with a stirrer, 800 ml of methylene chloride dehydrated with molecular sieves 4A (water content: 3 ppm) and 1200 ml of methylcyclohexane dehydrated with molecular sieves 4A (water content: 1 ppm) were charged, and then 1.0 g (4.3 mmol) of 1,4-bis(1-chloro-1-methylethyl)benzene, 1.96 g (18.2 mmol) of 2,6-dimethylpyridine and 0.68 g (8.6 mmol) of pyridine and 210 g of isobutylene were added respectively. While the temperature of the reaction system was kept at $-78°$ C., 12.3 g (65 mmol) of titanium tetrachloride was added to initiate polymerization, and 200 ml of methanol was added after 6 hours to terminate the polymerization. The polymerization degree was 100%.

The resultant reaction mixture was washed with water till pH equaled 7 and then reprecipitated in a great amount of methanol to obtain an isobutylene polymer having Mn at 50000 (Mn(Calcd): 49000) and Mw/Mn at 1.10. The nitrogen atom content of the resultant isobutylene polymer was less than a detection limit (10 ppm).

COMPARATIVE EXAMPLE 1

Polymerization of isobutylene and separation and purification after the polymerization were conducted under the same conditions as those in Example 1 except for not adding 2,6-dimethylpyridine. The polymerization degree was 100%. An isobutylene polymer having Mn at 35000 (Mn (Calcd): 49000) and Mw/Mn at 1.50 was obtained. The nitrogen atom content of the resultant isobutylene polymer was less than a detection limit (10 ppm).

COMPARATIVE EXAMPLE 2

Polymerization of isobutylene and separation and purification after the polymerization were conducted under the same conditions as those in Example 1 except for using 1.96 g (18.2 mmol) of 3,4-dimethylpyridine instead of 1.96 g (18.2 mmol) of 2,6-dimethylpyridine. The polymerization degree was only 8%. An isobutylene polymer having Mn at 5000 (Mn(Calcd): 49000) and Mw/Mn at 2.74 was obtained. The nitrogen atom content of the resultant isobutylene polymer was less than a detection limit (10 ppm).

EXAMPLE 2

In a dried reactor equipped with a stirrer, 800 ml of methylene chloride dehydrated with molecular sieves 4A (water content: 3 ppm) and 1200 ml of methylcyclohexane dehydrated with molecular sieves 4A (water content: 1 ppm) were charged, and then 1.0 g (4.3 mmol) of 1,4-bis(1-chloro-1-methylethyl)benzene, 1.96 g (18.2 mmol) of 2,6-dimethylpyridine and 0.68 g (8.6 mmol) of pyridine and 210 g of isobutylene were added respectively. While the temperature of the reaction system was kept at −78° C., 12.3 g (65 mmol) of titanium tetrachloride was added to initiate polymerization of isobutylene. After polymerization for 6 hours, 90 g of styrene dehydrated with molecular sieves 4A and aluminum oxide (water content: 1 ppm) and 1.0 g (9.4 mmol) of 2,6-dimethylpyridine were added to initiate styrene polymerization at −78° C. 200 ml of methanol was added after 6 hours of styrene polymerization to terminate the reaction.

The resultant reaction mixture was washed with water till pH equaled 7 and then reprecipitated in a great amount of methanol to obtain a polystyrene-polyisobutylene-polystyrene type triblock copolymer. The resultant copolymer had Mn at 73000 and Mw/Mn at 1.20. In the resultant copolymer, the polystyrene block had Mn at 11000 and the polyisobutylene block had Mn at 50000 (Mn(Calcd): 49000). The nitrogen atom content of the resultant copolymer was less than a detection limit (10 ppm).

COMPARATIVE EXAMPLE 3

Polymerizations of isobutylene and styrene and separation and purification after the polymerization were conducted under the same conditions as those in Example 2 except for using 3.48 g (18.2 mmol) of 2,6-di-t-butylpyridine instead of 1.96 g (18.2 mmol) of 2,6-dimethylpyridine added before isobutylene polymerization and using 1.79 g (9.4 mmol) of 2,6-di-t-butylpyridine instead of 1.0 g (9.4 mmol) of 2,6-dimethylpyridine added simultaneously with styrene, to obtain a polystyrene-polyisobutylene-polystyrene type triblock copolymer. The resultant copolymer had Mn at 71000 and Mw/Mn at 1.18. In the resultant copolymer, the polystyrene block had Mn at 11000 and the polyisobutylene block had Mn at 49000 (Mn(Calcd): 49000). The nitrogen atom content of the resultant copolymer was 45 ppm.

EXAMPLE 3

Polymerization of isobutylene, polymerization of styrene and separation and purification after the polymerizations were conducted under the same conditions as those in Example 2 except for using 0.40 g (8.6 mmol) of diethyl ether instead of 0.68 g (8.6 mmol) of pyridine, to obtain a polystyrene-polyisobutylene-polystyrene type triblock copolymer. The resultant copolymer had Mn at 71000 and Mw/Mn at 1.26. In the resultant copolymer, the polystyrene block had Mn at 11000 and the polyisobutylene block had Mn at 49000 (Mn(Calcd): 49000). The nitrogen atom content of the resultant copolymer was less than a detection limit (10 ppm).

EXAMPLE 4

In a dried reactor equipped with a stirrer, 1000 ml of methylene chloride dehydrated with molecular sieves 4A (water content: 3 ppm) and 1000 ml of hexane dehydrated with molecular sieves 4A (water content: 1 ppm) were charged and then 2.0 g (8.6 mmol) of 1,4-bis(1-chloro-1-methylethyl)benzene, 3.9 g (36 mmol) of 2,6-dimethylpyridine, 1.5 g (17.2 mmol) of N,N-dimethylacetamide and 210 g of isobutylene were added respectively. While the temperature of the reaction system was kept at −78° C., 12.3 g (65 mmol) of titanium tetrachloride was added to initiate polymerization of isobutylene. After polymerization for 3 hours, 90 g of styrene dehydrated with molecular sieves 4A and aluminum oxide (water content: 1 ppm) and 1.0 g (9.4 mmol) of 2,6-dimethylpyridine were added to initiate styrene polymerization at −78° C. 200 ml of methanol was added after 4 hours of styrene polymerization to terminate the reaction.

The resultant reaction mixture was washed with water till pH equaled 7 and then reprecipitated in a great amount of methanol to obtain a polystyrene-polyisobutylene-polystyrene type triblock copolymer. The resultant copolymer had Mn at 38000 and Mw/Mn at 1.25. In the resultant copolymer, the polystyrene block had Mn at 5000 and the polyisobutylene block had Mn at 27000 (Mn(Calcd): 25000). The nitrogen atom content of the resultant copolymer was less than a detection limit (10 ppm).

EXAMPLE 5

Polymerization of isobutylene, polymerization of styrene and separation and purification after the polymerization were conducted under the same conditions as those in Example 4 except for using 1.17 g (17.2 mmol) of ethyl acetate instead of 1.5 g (17.2 mmol) of N,N-dimethylacetamide, to obtain a polystyrene-polyisobutylene-polystyrene type block copolymer. The resultant copolymer had Mn at 36000 and Mw/Mn at 1.22. In the resultant copolymer, the polystyrene block had Mn at 5000 and the polyisobutylene block had Mn at 26000 (Mn(Calcd): 25000). The nitrogen atom content of the resultant copolymer was less than a detection limit (10 ppm).

EXAMPLE 6

In a dried reactor equipped with a stirrer, 500 ml of methylene chloride dehydrated with molecular sieves 4A (water content: 3 ppm) and 500 ml of hexane dehydrated with molecular sieves 4A (water content: 1 ppm) were charged and then 0.35 g (1.5 mmol) of 1,4-bis(1-chloro-1-methylethyl)benzene, 0.98 g (9.1 mmol) of 2,6-dimethylpyridine, 0.23 g (2.9 mmol) of dimethyl sulfoxide and 60 g of isobutylene were added respectively. While the temperature of the reaction system was kept at −78° C., 4.3 g (23 mmol) of titanium tetrachloride was added to initiate polymerization of isobutylene. After polymerization for 5 hours, 40 g of styrene dehydrated with molecular sieves 4A and aluminum oxide (water content: 1 ppm) and 0.22 g (2.1 mmol) of 2,6-dimethylpyridine were added, to initiate styrene polymerization at −78° C. 100 ml of methanol was added after 6 hours of styrene polymerization to terminate the reaction.

The resultant reaction mixture was washed with water till pH equaled 7 and then reprecipitated in a great amount of methanol to obtain a polystyrene-polyisobutylene-polystyrene type triblock copolymer. The resultant copolymer had Mn at 69000 and Mw/Mn at 1.22. In the resultant copolymer, the polystyrene block had Mn at 14000 and the polyisobutylene block had Mn at 41000 (Mn(Calcd): 40000). The nitrogen atom content of the resultant copolymer was less than a detection limit (10 ppm).

EXAMPLE 7

In a dried reactor equipped with a stirrer, 800 ml of methylene chloride dehydrated with molecular sieves 4A (water content: 3 ppm) and 1200 ml of methylcyclohexane dehydrated with molecular sieves 4A (water content: 1 ppm) were charged and then 1.4 g (6.1 mmol) of 1,4-bis(1-chloro-1-methylethyl)benzene, 1.96 g (18.2 mmol) of 2,6-dimethylpyridine, 0.72 g (12.2 mmol) of triethylamine and 240 g of isobutylene were added respectively. While the temperature of the reaction system was kept at −78° C., 17.2 g (91 mmol) of titanium tetrachloride was added to initiate polymerization of isobutylene. After polymerization for 4 hours, 60 g of styrene dehydrated with molecular sieves 4A and aluminum oxide (water content: 1 ppm) and 0.67 g (6.25 mmol) of 2,6-dimethylpyridine were added, to initiate styrene polymerization at −78° C. 200 ml of methanol was added after 4 hours of styrene polymerization to terminate the reaction.

The resultant reaction mixture was washed with water till pH equaled 7 and then reprecipitated in a great amount of methanol to obtain a polystyrene-polyisobutylene-polystyrene type triblock copolymer. The resultant copolymer had Mn at 31000 and Mw/Mn at 1.25. In the resultant copolymer, the polystyrene block had Mn at 4000 and the polyisobutylene block had Mn at 24000 (Mn(Calcd): 25000). The nitrogen atom content of the resultant copolymer was less than a detection limit (10 ppm).

It can be seen from Examples 1–7 described above that the process according to the present invention can form a desired polymer with a number average molecular weight approximate to a theoretical value and a narrow molecular weight distribution even if vinylic compounds and/or polymerization solvents not subjected to strict dehydration and containing a slight amount of water are used and that the polymerization additives can be removed efficiently from the polymer by a simple and convenient water washing method. On the contrary, it can be seen from Comparative Example 1 that control for the average molecular weight and attainment of narrow molecular weight distribution are insufficient in the resultant polymer if the pyridine derivative (A) is not present in the polymerization reaction system in a case of using a polymerization solvent not subjected to strict dehydration. Further, it can be seen from Comparative Example 2 that, in a case of using a polymerization solvent not subjected to strict dehydration, the rate of polymerization is lowered remarkably and the molecular weight distribution in the resultant polymer is made broader by using a pyridine derivative having no substituent at either 2-position or 6-position instead of the pyridine derivative (A). Further, it can be seen from Comparative Example 3 that when 2,6-di-t-butylpyridine known as a proton scavenger is used instead of the pyridine derivative (A), the additive can not easily be separated and removed from the resultant polymer.

What is claimed is:

1. A process for producing a polymer of vinylic compounds in which at least one unsubstituted or halogen-substituted vinylic hydrocarbon compound is polymerized by using an initiator system comprising a compound containing, in the molecule, at least one group represented by the general formula:

where each of $R^1$ and $R^2$ represents an alkyl, aryl, or aralkyl group, and X represents an acyloxyl, alkoxyl, or hydroxyl group or a halogen atom, and a Lewis acid, wherein (1) at least one pyridine derivative (A) selected from the group consisting of a pyridine derivative (A-1) substituted at 2-position and 6-position with methyl group respectively and a pyridine derivative (A-2) substituted at 2-position with an alkyl group of 2 to 6 carbon atoms and not substituted at 6-position, and (2) an organic Lewis base (B) other than said pyridine derivative (A), are present together in the polymerizing reaction system.

2. A process of claim 1, wherein the pyridine derivative (A) is the pyridine derivative (A-1) substituted at 2-position and 6-position with methyl group respectively.

3. A process of claim 2, wherein the pyridine derivative (A-1) is a compound represented by the general formula:

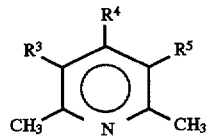

where each of $R^3$, $R^4$ and $R^5$ represents a hydrogen atom or an alkyl group, providing that the sum of the number of carbon atoms contained in $R^3$, $R^4$ and $R^5$ is an integer within a range from 0 to 3.

4. A process claim of 3, wherein the pyridine derivative (A-1) is 2,6-dimethylpyridine.

5. A process of claim 1, wherein the organic Lewis base (B) is an organic Lewis base having not more than 10 carbon atoms in the molecule.

6. A process of claim 1, wherein the organic Lewis base (B) is at least one compound selected from the group consisting of pyridines having no substituent at either 2-position or 6-position, amines, carboxylic acid esters, ethers, carboxylic acid amides, ketones, sulfinyl compounds and phosphoric acid amides.

7. A process of claim 1, wherein the mol number of the pyridine derivative (A) is within a range from 0.1 to 100 times the mol number of the group shown by the general formula (I).

8. A process of claim 1, wherein the mol number of the Lewis acid is not less than the sum of the mol number of the group shown by the general formula (I), the pyridine derivative (A) and the organic Lewis base (B) and is within a range from 1 to 100 times the mol number of the group shown by the general formula (I).

9. A process of claim 1, wherein the mol number of the organic Lewis base (B) is within a range from 0.1 to 100 times the mol number of the group shown by the general formula (I).

10. A process of claim 1, wherein a block copolymer is produced by adding plural kinds of unsubstituted or halogen-substituted vinylic hydrocarbon compounds successively to the polymerizing reaction system.

11. A process of claim 1, wherein the resultant reaction mixture is washed with an aqueous liquid after the completion of the polymerizing reaction.

* * * * *